United States Patent
Striuli et al.

(10) Patent No.: US 9,295,034 B2
(45) Date of Patent: Mar. 22, 2016

(54) BI-DIRECTIONAL COMMUNICATION METHOD IN A CELLULAR MOBILE TELECOMMUNICATION NETWORK AND RELATIVE TELECOMMUNICATION NETWORK

(75) Inventors: Alessandro Striuli, Venice (IT); Pietro Porzio Giusto, Rome (IT)

(73) Assignee: SISVEL TECHNOLOGY, S.R.L., None (IT)

(*) Notice: Subject to any disclaimer, the term of this patent is extended or adjusted under 35 U.S.C. 154(b) by 85 days.

(21) Appl. No.: 13/807,544

(22) PCT Filed: Jul. 29, 2011

(86) PCT No.: PCT/IB2011/053383
§ 371 (c)(1),
(2), (4) Date: Dec. 28, 2012

(87) PCT Pub. No.: WO2012/014179
PCT Pub. Date: Feb. 2, 2012

(65) Prior Publication Data
US 2013/0100924 A1 Apr. 25, 2013

(30) Foreign Application Priority Data
Jul. 30, 2010 (IT) .............................. TO2010A0663

(51) Int. Cl.
*H04L 12/26* (2006.01)
*H04W 72/04* (2009.01)
(Continued)

(52) U.S. Cl.
CPC .............. *H04W 72/04* (2013.01); *H04W 48/18* (2013.01); *H04W 28/16* (2013.01); *H04W 48/20* (2013.01)

(58) Field of Classification Search
CPC ..................... H04L 29/12283; H04L 29/1232; H04L 5/001; H04L 5/0053; H04L 61/2061; H04L 61/2092; H04W 16/14; H04W 48/08; H04W 48/12; H04W 68/00; H04W 72/02; H04W 74/00; H04W 80/04; H04W 88/08
USPC .......... 370/254, 278, 281, 329; 455/525, 436, 455/453
See application file for complete search history.

(56) References Cited

U.S. PATENT DOCUMENTS 5,487,174 A * 1/1996 Persson .......................... 455/444
7,177,666 B2 2/2007 Striuli
(Continued)

FOREIGN PATENT DOCUMENTS

WO 93/19537 9/1993

OTHER PUBLICATIONS

International Search Report dated Oct. 18, 2011 issued in PCT Application No. PCT/IB2011/053383, filed Jul. 29, 2011.
(Continued)

*Primary Examiner* — Dang Ton
*Assistant Examiner* — Sai Aung
(74) *Attorney, Agent, or Firm* — Workman Nydegger

(57) ABSTRACT

A method of bi-directional communication in a cellular mobile telecommunication network (2) includes a terminal (10) that receives signals transmitted by at least one radio base station (5,7) of a downlink network of the cellular mobile telecommunication network (2) and selects one serving transmitting radio base station (6) among one or more transmitting (5) or transceiving (7) radio base stations of the downlink network, wherein the downlink network operator selects one serving receiving radio base station (8) among one or more receiving radio base stations (3,7) of an uplink network which have received a signalling message (URRA) transmitted by the terminal (10). By way of the serving receiving base station (8) of the uplink network and the serving transmitting base station (6) of the downlink network, the terminal (10) establishes bi-directional connections over the cellular mobile telecommunication network (2).

16 Claims, 3 Drawing Sheets

(51) Int. Cl.
*H04W 48/18* (2009.01)
*H04W 28/16* (2009.01)
*H04W 48/20* (2009.01)

(56) References Cited

U.S. PATENT DOCUMENTS

| | | | |
|---|---|---|---|
| 2003/0073455 A1* | 4/2003 | Hashem et al. | 455/525 |
| 2007/0110058 A1* | 5/2007 | Park | 370/389 |
| 2009/0197605 A1* | 8/2009 | Kawasaki | 455/437 |
| 2010/0165873 A1* | 7/2010 | Higuchi et al. | 370/254 |
| 2011/0032848 A1* | 2/2011 | Sagae et al. | 370/278 |
| 2012/0218903 A1* | 8/2012 | Baldemair et al. | 370/242 |

OTHER PUBLICATIONS

Written Opinion dated Oct. 18, 2011 issued in PCT Application No. PCT/IB2011/053383, filed Jul. 29, 2011.

\* cited by examiner

BI-DIRECTIONAL COMMUNICATION METHOD IN A CELLULAR MOBILE TELECOMMUNICATION NETWORK AND RELATIVE TELECOMMUNICATION NETWORK

BACKGROUND OF THE INVENTION

1. Field of the Invention

The present invention relates to a method of bi-directional communication in a cellular mobile telecommunication network, wherein the downlink and uplink networks are managed separately.

2. Present State of the Art

Cellular-coverage mobile telecommunication networks have been rapidly evolving since their very appearance on the mass market in the eighties.

Initially these networks mainly supported voice services; today, however, the most pressing and significant demand concerns data services.

The ever increasing use of data applications of various kinds requires more and more bandwidth: however, this need clashes with the limits of the available radio resource.

Technologic evolution is therefore strongly stimulated by the constant demand for a performance increase as to the networks' transmission speed and capacity.

The technical solutions which may be adopted to increase the networks' capacity can be classified into two main categories:
- greater frequency re-use by increasing the number of cells (which therefore become smaller and smaller in size);
- definition of more efficient modulation methods, which allow for transmitting greater quantities of data on the frequency band available from time to time.

The number of cells and modulation efficiency are however both subject to physical (and economical) limits. The limits of pico-cellular coverages are mainly given by the costs required by the numerousness of plants (apparatuses, installation, maintenance, backhauling).

It must however be observed that the smaller the cell size, and therefore the shorter the distance between the corresponding radio-base stations, i.e. between the various radio transceiving systems ("Receive Transmit Fixed Radio", or RTFR), the more the network planning complexity increases, to such an extent that it can be assumed that the decrease in the cell size is subject to a practical limit. Said limit depends, according to case, on the propagation conditions.

On the other hand, the modulation efficiency limits depend on the fact that an extreme modulation increases the signal-to-noise ratio level (SNR) required for reception, until it becomes untenable for the transmission system.

The sophisticated transmission error correction codings employed today allow for transmission capacities close to Shannon's theoretical limit, so that they can only be used in practice for exchanging, the signal-to-noise ratio for the signals' band occupation, i.e. for optimizing the transmission speed within the band and power limits that must be complied with, which are critical especially when transmitting from a terminal to a radio base station (uplink).

Other mechanisms affecting the capacity of cellular mobile systems, such as "scheduling", antenna systems using various diversity techniques and MIMO (Multiple Input Multiple Output), have been the subject of several studies and have already been applied within the complexity limits allowed by the current technology.

However, with the considerable growth of the demand for data transmission, it is still most important to efficiently use the frequency resources.

In addition to being a meagre resource compared to the number of users, frequencies are also lacking in relation to the number of operators; the latter, in fact, must be in a reasonable number in order to create a competitive market, with the result that the available bands are broken up and trunking efficiency is reduced.

Extensive frequency re-use by employing smaller and smaller cells or more and more directive antennas determines an increasingly sharper difference between the technical problems that must be faced in Down-Link transmission (DL) and those involved in Up-Link transmission (UL).

Downlink coverages can use bigger antenna systems to create space diversity, as well as directive beams. They have higher transmission power ratings, and can therefore serve larger coverage areas, offer higher transmission speeds, and use higher frequencies. They can use advanced low-noise receivers, and their apparatuses can be housed in conditioned environments.

Uplink coverages utilize transceivers which are subject to size, weight and emission level constraints that limit their transmission power and their use of space diversity.

High bit-rate services provided also in the uplink direction are thus placed at a disadvantage, especially in connections with relatively "far" sites. Nowadays, in fact, the uplink transmission speeds provided are usually much slower than downlink speeds.

Signalling systems are known in the art which allow network terminals for cellular-coverage mobile services to lock to a network and be assigned the radio resources (if available) that they require to be able to support the communication service requested from time to time.

Such signalling systems are based on a sequence of messages which can be represented in brief as follows:
- a terminal receives a "broadcast" signal from various transceiving radio base stations:
- based on different criteria (among which the quality of the received signal), the terminal locks to one of these transceiving radio base stations, called serving transceiving radio base station (or RTFR);
- the terminal has all the necessary information (whether obtained from the broadcast control signal or provided by a standard) to transmit any connection requests to the serving transceiving radio base station:
- vice versa, the serving transceiving radio base station has all the necessary information to notify the terminal of the arrival of any calls for it and to establish any connections;
- when the terminal requests a connection, or when a call for the terminal originates from the network, the network assigns the resources for the subsequent communication steps.

It must be pointed out that the radio base station towards which the terminal must transmit and from which it must initially receive is chosen by the terminal itself, whereas afterwards it can be "re-selected" by the terminal or by the network. At any rate, the terminal knows the serving transceiving radio base station on which it is camped.

It is also known from U.S. Pat. No. 7,177,666 a telecommunication network for mobile telephone users wherein uplink coverage is distinct from downlink coverage. In particular, uplink coverage is at least partly ensured by unidirectional radio base stations exclusively dedicated to uplink coverage, while downlink coverage is at least partly ensured by unidirectional radio base stations exclusively dedicated to downlink coverage.

However, U.S. Pat. No. 7,177,666 does not point out how to select the receiving radio base station that must serve the user terminal in the uplink section.

SUMMARY OF THE INVENTION

The object of the present invention is to provide a bi-directional communication method in a cellular mobile telecommunication network which allows to increase the capacity of the network itself.

It is another object of the present invention to provide a bi-directional communication method in a cellular mobile telecommunication network which allows to apply codings and/or modulations adapted to enhance the transmission of data within the network.

It is a further object of the present invention to provide a bi-directional communication method in a cellular mobile telecommunication network which allows to separate uplink transmission from downlink transmission, so as to optimize the quantity of cells in the network while fully exploiting the downlink networks' functionalities.

Yet another object of the present invention is to provide a bi-directional communication method in a cellular mobile telecommunication network wherein co-operation scenarios can be configured among network operators with considerable infrastructural resources and small network operators that can ensure capillary territorial signal coverage.

These and other objects of the invention are achieved by the bi-directional communication method and the telecommunication network as claimed in the appended claims, which are intended as an integral part of the present description.

In short, the present invention teaches how to support mobile telecommunication services through an infrastructure, or a complex of infrastructures, wherein the assignment of the radio resources for downlink communication from infrastructure to terminal and the assignment of the radio access resources for uplink communication from terminal to infrastructure can take place with the utmost flexibility.

In the most general case, those sites where the radio reception and transmission systems are installed may be different between uplink and downlink because, in addition to transceiving radio base stations, there may also be radio base stations which are only suitable for radio transmission or radio reception.

Furthermore, the frequencies associated with the two directions may not be predetermined during the system design stage.

In general, even the radio base stations' technologies may not be homogeneous or predetermined between the two uplink and downlink directions, and, still in general, the network managers/operators may be different and share out the burden of supporting every single communication.

In other words, the uplink and downlink coverages may either belong to the same network or to two different networks.

The present invention teaches how to handle a process for acquiring the communication resources required by a mobile telecommunication service instance, within a more general and complex scenario. This can be achieved by including appropriate information in signalling messages and by using a new signalling message.

The scenario essentially includes transmitting-only radio base stations of a downlink network having characteristics substantially similar to those of the radio base stations of known cellular networks, with the addition of receiving radio base stations of an uplink network fitted with radio receivers only.

When, in some sites, a transmitting-only radio base station is integrated with a receiving-only radio base station, such a system can be considered to be a transceiving radio base station.

One peculiarity that characterizes the telecommunication network adopting the method of the invention is that it is the network itself that selects the serving receiving radio base station appointed to supporting the uplink communication among all the radio base stations capable of receiving a signalling message transmitted by a terminal.

In general, the network can make the selection based on criteria of its own, in that this choice is characterized by the utmost flexibility.

In any case, the network will make the selection on the basis of the information it has got, which may differ depending on the network structure, in particular on the basis of information that may be entered into the signalling message.

BRIEF DESCRIPTION OF THE DRAWINGS

Further features and objects of the invention will be set out in the appended claims, which are intended as an integral part of the present description; the teachings of the invention will become more apparent from the following detailed description of a preferred but non-limiting example of embodiment thereof with reference to the annexed drawings, wherein:

DETAILED DESCRIPTION OF THE PREFERRED EMBODIMENTS

Figure 1:
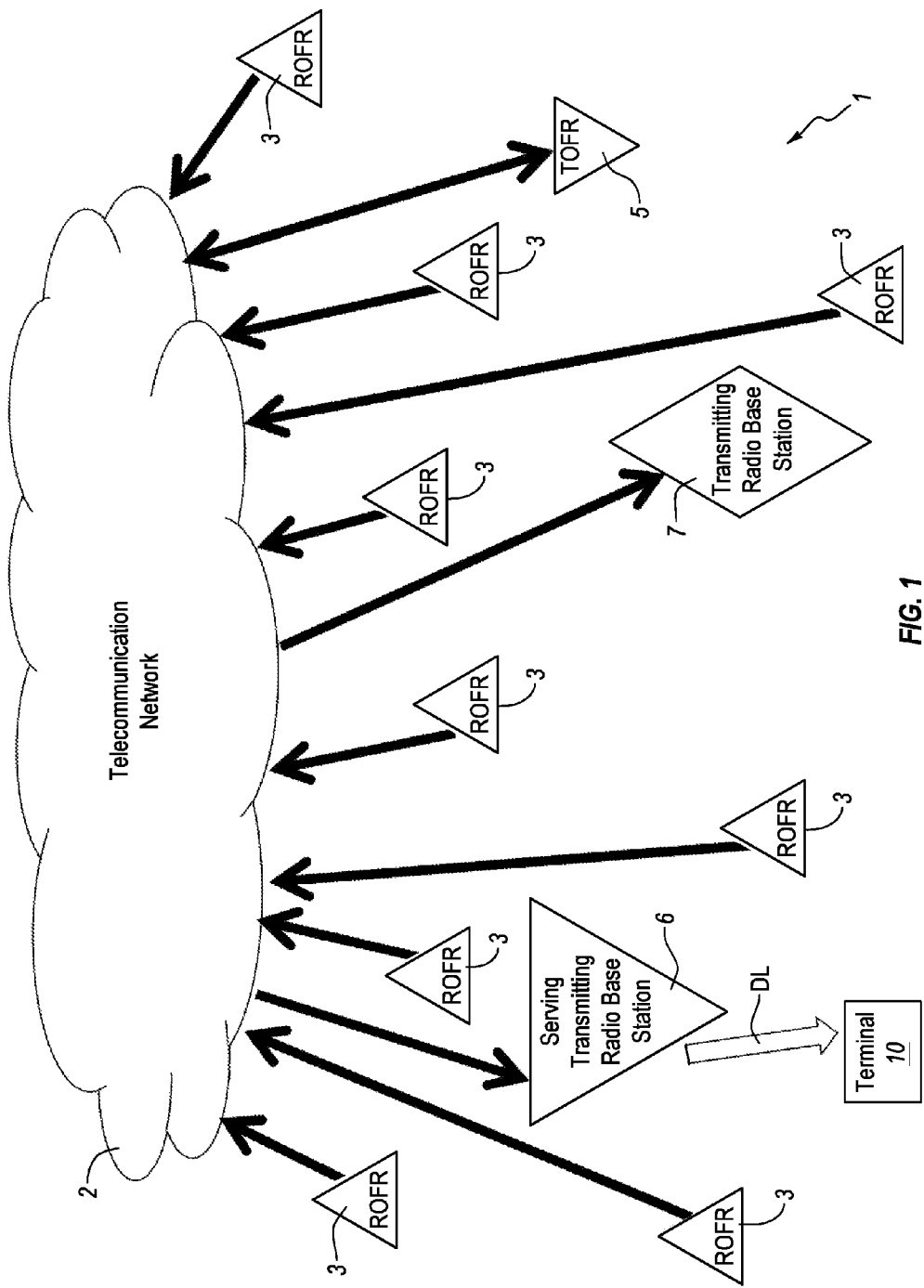
FIG. 1 shows a cellular mobile telecommunication system comprising a telecommunication network with various types of radio base stations, wherein a terminal locks to a downlink station.

Referring now to FIG. 1, there is shown a cellular mobile telecommunication system 1 comprising a telecommunication network 2 and radio base stations 3,5.7 of three different types:
  receiving-only radio base stations 3 (ROFR, "Receiving Only Fixed Radio");
  transmitting-only radio base stations 5 (TOFR, "Transmitting Only Fixed Radio");
  transceiving radio base stations 7 (RTFR).
  It should be noted that the telecommunication network 2 may comprise one or more telecommunication networks, even of different typologies.

A terminal 10, in particular a user terminal, locks to a transmitting-only radio base station 5 of the downlink network of the telecommunication network 2, similarly to what happens in cellular mobile telecommunication networks. Alternatively, the terminal 10 may lock to the transmitting part of a transceiving radio base station 7. The transmitting base station to which the terminal 10 locks is labelled 6 in the attached drawings and will be called "serving transmitting radio base station 6" or "downlink serving base station 6".

Figure 2:
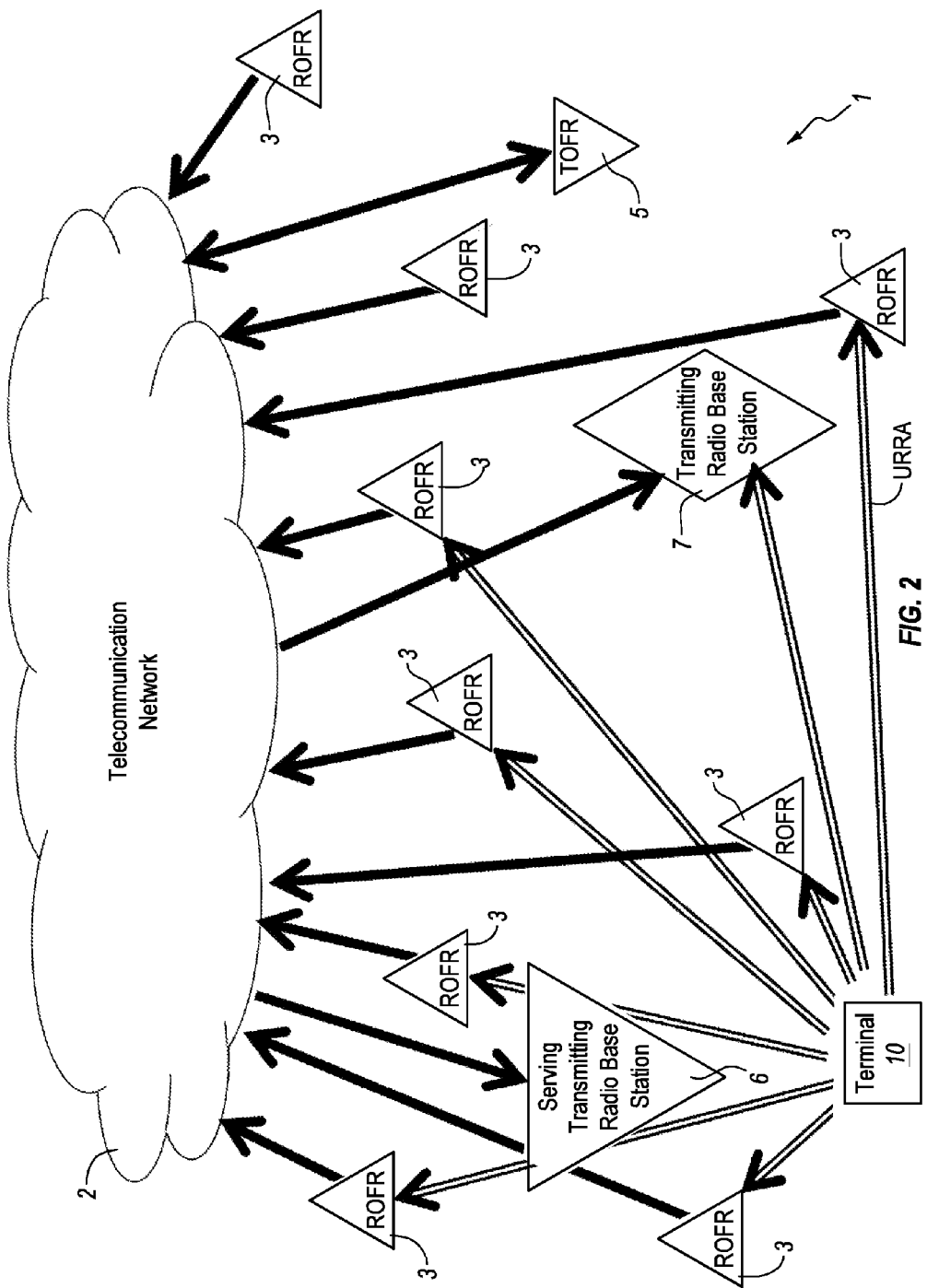
FIG. 2 shows the system of FIG. 1, when the terminal issues a signalling message into the network.

With reference to FIG. 2, the terminal 10 broadcasts a message of the type used for random access to cellular networks, hereafter referred to as URRA (Uplink Request via Random Access) message. Said URRA message allows the terminal 10 to present itself to the uplink network, which comprises the receiving radio base stations 3,7. Besides transmitters suitable for broadcasting the URRA message, the terminal 10 has the means that regular cellular terminals have to interact with cellular networks. In particular terminal 10 has a radio transmitter apt to transmit and receive signals carrying information in an analogue or digital form, detection circuits for identifying transmitting radio stations, logic circuits for selecting a transmitting radio station out of a plurality of receivable radio stations and camping on the selected one for reception purposes, etc. Below it will be described how terminal 10 interacts with the telecommunication system.

The URRA message includes an identifier ID, which may be of the random type, or the identity T_ID of the terminal 10. In another embodiment, the URRA message may also include, for commercial purposes, the identifier TOFRs_id of the serving transmitting radio base station 6.

The URRA message may contain further information, such as, for example, the power transmitted by the terminal 10, quality parameters relating to reception by the terminal 10 from both the serving transmitting radio base station 6 and any other transmitting-only radio base stations 5, the estimated geographical position of the terminal 10, and so on.

The receiving-only radio base stations 3 and the transceiving radio base stations 7 that receive the URRA message stand as candidates for serving receiving radio base station 8 (ROFRs), i.e. the receiving radio base station suitable for carrying out the uplink coverage service for the terminal 10.

To this end, whether directly or indirectly through the network elements to which they relate, the receiving radio base stations 3,7 forward a confirmation message containing at least their own identifier ROFR_id and an identifier T_ID of the terminal 10 to the network to which the serving transmitting radio base station 6 belongs, i.e. to the downlink network.

The confirmation message may also contain an identifier TOFRs_id of the serving transmitting radio base station 6. the power level at which the receiving radio base stations 3,7 have received the URRA message of the terminal 10, and the indication of the transmission resources that they have available for possibly establishing a connection with the terminal 10.

Among those receiving radio base stations 3,7 that have sent the confirmation message, the downlink network of the serving transmitting radio base station 6 selects, according to criteria of its own, the one (i.e. the ROFRs) which must act as an uplink serving station for the terminal 10, and then determines, within the limits set by the received confirmation messages and by other criteria imposed by the management system and by the network controllers, which transmission resources must be dedicated to the uplink connection and to the downlink connection.

Figure 3:
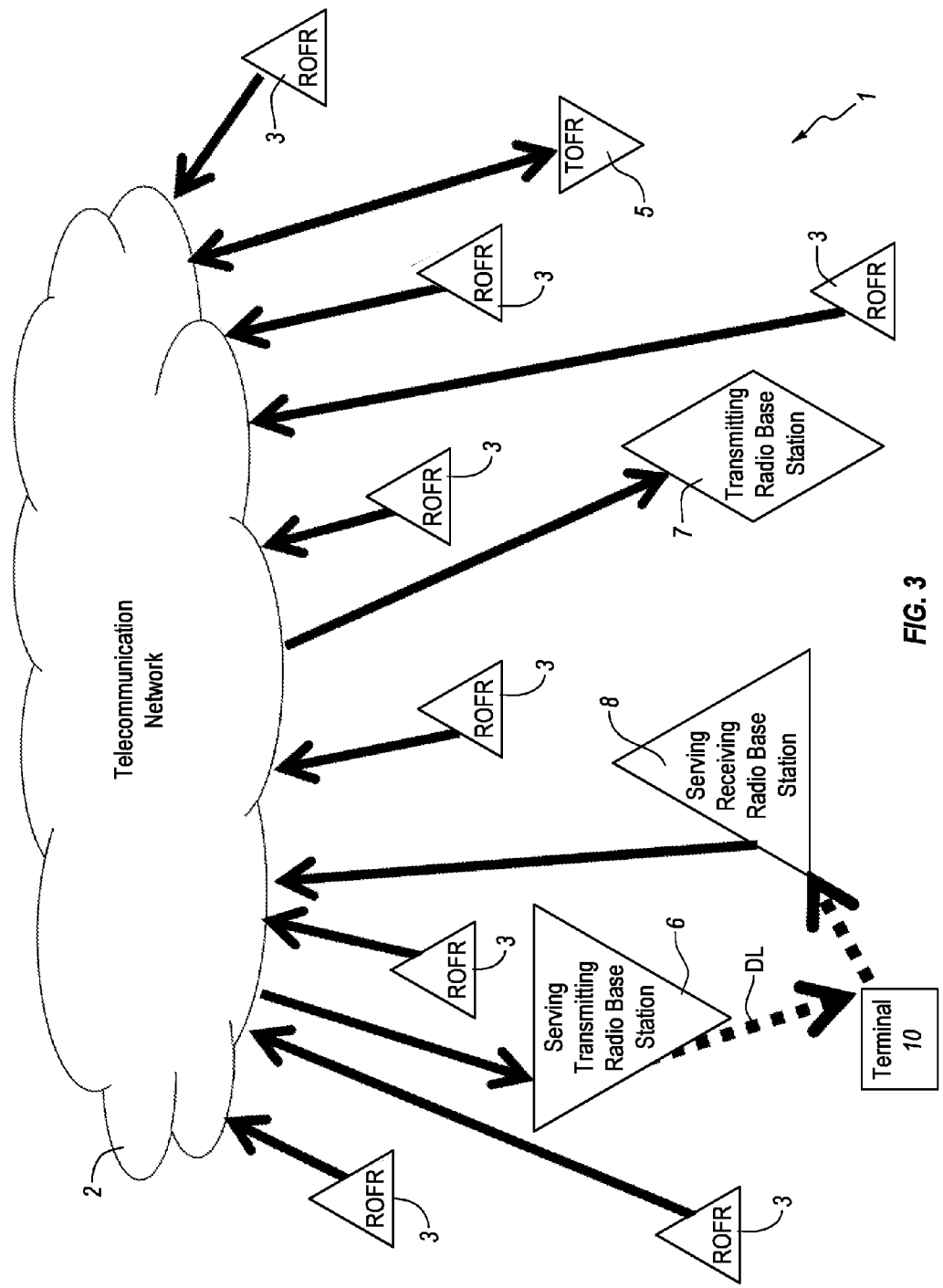
FIG. 3 shows the system of FIG. 1, highlighting the establishment of a communication among the terminal, a downlink station and an uplink station.

At this point, the transmitting radio base station 6 sends a message to the terminal 10 that includes the information necessary for the latter to establish an uplink connection, as shown in FIG. 3.

Finally, the serving transmitting radio base station 6, in agreement with the serving receiving radio base station 8 and the terminal 10, opens the bi-directional connection. When there is a call for the terminal 10, the procedure is similar to the one described above for a call originated by the terminal 10, but it is preceded by the "paging" of the terminal 10, i.e. the call alert signal for the terminal 10, which the telecommunication network 2 broadcasts in the "Location Area" (GSM/UMTS terminology) or in the "Tracking Area" (LTE terminology). Once it has received the call alert signal, the terminal 10 sends a URRA message, after which the exchange of information between the terminal 10 and the network 2 can go on in substantially the same manner until the bi-directional connection is established.

The localization of the terminal 10 in the Location (or Tracking) Areas may take place by using the transceiving, radio base stations 7 only or by using a set consisting of one transmitting-only radio base station 5 and one receiving-only radio base station 3. Location (or Tracking) Areas may contain multiple transmitting-only radio base stations 5 and multiple receiving-only radio base stations 3.

Moreover, the signals transmitted by the terminal 10 may be received and processed simultaneously by multiple receiving radio base stations 3,7, co-operating to improve the quality of reception of the signals issued by the terminal 10. Likewise, the signals transmitted from the downlink network to the terminal 10, according to the transmission technique in use, may be transmitted simultaneously by multiple downlink radio base stations 5,7, so that they can be combined within the reception system of the terminal 10 to improve the downlink transmission.

As aforementioned, the network 2 selects the serving receiving radio base station 8 among the plurality of receiving radio base stations 3,7 on the basis of criteria of its own.

A first example of a selection criterion is based on a just a small quantity of information; according to this example, the network knows the user's identity, the operator that the terminal refers to (i.e. the operator to which the terminal owner has subscribed), and the power at which the URRA message is being received by each receiving radio base station 3,7: in this case, the choice may privilege the power level and, within commercial limits, the uplink transmission support may be assigned to that radio base station 3,7 which has received the most powerful URRA message.

As an alternative, assuming that the candidate receiving radio base stations 3,7 are managed by different operators, priority may be given to a particular operator, selecting the best receiving radio base station 3,7 among those of the preferred operator.

Receiving radio base stations 3,7 of other operators may be taken into consideration with different priority levels, in the event that the preferred operator does not have any radio base stations offering sufficient quality.

It is clear that, even in the case of reception of just a few basic pieces of information, the criteria for selecting the serving receiving radio base station 8 may vary extensively: each candidate receiving radio base station 3,7 may, for example, be assigned a score based on the managing operator and on the quality with which it could serve the call in question, and the choice may come down to selecting that receiving radio-base station 3,7 which has the highest score.

Another piece of information which may be taken into account as a criterion for selecting the receiving radio base station 6 may be related to traffic, and the strategy may be that of promoting the use of those radio base stations which are statistically less frequently saturated with traffic, so as to preserve the capacity of those radio base stations where new requests are more likely to arrive.

In more complex scenarios, different technologies suitable for creating radio access systems may coexist and be integrated together to co-operate in accordance with the teachings of the present invention. In such a case, the selection of the receiving radio base station 3,7 may also have to take into account which technologies are supported by the terminal 10 or, when technologies offering different performance levels are used, the selection of the receiving radio base station 6 may also be based on the knowledge of the service that will have to be supported: for example, GSM stations may be used for a telephone service, but they are not suitable for advanced data services, for which other types of stations should be employed.

Further criteria for the selection of the receiving radio base station 3,7 may be due to commercial reasons: for example, certain receiving radio base stations 3,7 may be reserved for high-end services or customers, and may be associated with different prices.

The selection criterion may thus depend on the network scenario 2 concerned, on the information contained in the URRA message, on the type of service to be provided, and on other issues of commercial nature.

The information contained in the URRA message may be limited to that set which is strictly necessary from a functional viewpoint, but it may be broadened to an extended set including also commercial information and information about the type of service requested or describing the potentialities of the terminal 10. The latter information may also be obtained otherwise starting from the identity of the terminal 10, possibly by consulting databases maintained by the operator to which the owner of the terminal 10 has subscribed. The protocol for establishing a bi-directional communication according to the invention is advantageously very general. Depending on the information entered into the URRA message, it may support communications established within the range of a single network, or it may allow creating scenarios wherein every single terminal has access to a multi-operator/multi-technology network, such as the telecommunication network 2. If the network 2 is a multi-operator network, the selection of the serving transmitting radio base station 6 is made by one of said operators, preferably by the very operator that operates that serving transmitting radio base station 6.

According to a first embodiment of the invention, the cellular mobile telecommunication system 1 operates in FDD (Frequency Division Duplex) mode, with matched pairs of radio channels, wherein the channels of each pair (one downlink channel and one uplink channel) have the same bandwidth and are frequency-spaced by a preset duplex spacing, i.e. the frequency distance between the downlink channel and the uplink channel.

Each of said channels may however be shared by multiple users by using known time division techniques.

In a second embodiment, the system can operate in FDD mode with pairs of radio channels wherein the channels of each pair have the same bandwidth but are frequency-spaced by a variable duplex frequency, which may be assigned when determining the radio resources to be used for the two transmission directions, or may be predetermined as a function of the downlink frequency. Variable duplex frequency offers the advantage that the available frequency bands can be used in a more flexible way and that the number of radio channels used in the uplink section can be different from that in the downlink section. In this case as well, time division may be used for sharing the transmission resources among multiple users.

In a third embodiment, the system can operate in FDD mode with pairs of radio channels wherein the channels of each pair have different bandwidths and are frequency-spaced by a variable duplex frequency, so that the available frequency bands can be used even more flexibly. The bandwidth of the channels, in particular of the uplink channel, and the duplex frequency may be assigned when determining the radio resources to be used for the two transmission directions, or may be predetermined as a function of the downlink frequency. In this case as well, time division may be used for sharing the transmission resources among multiple users.

Of course, the invention is also applicable to systems operating in TDD (Time Division Duplex) mode, even though today the FDD mode appears to be preferable due to the high level of flexibility it provides.

In further embodiments, the receiving-only radio base stations 3 that receive the URRA message may belong to systems being different and technologically heterogeneous with respect to the transmitting-only radio base stations 5 to which the terminal 10 is locked. For example, the receiving-only radio base stations 3 may be access points of a Wi-Fi Wireless LAN. Said access points, when fitted with a receiver enabled to listen to URRA messages, may be suited to supporting the uplink traffic of a terminal equipped with a Wi-Fi interface. Of course, establishing such a heterogeneous connection will require appropriate agreements among the various network operators as well as suitable networking procedures: however, the URRA signalling messages, possibly standardized to transport the necessary information, are suited to supporting such scenario typologies. Many are the ways in which it is possible to ensure that all the receiving-only radio base stations 3 and all the transceiving radio base stations 7 in the area where the terminal 10 can establish bi-directional connections can receive the URRA messages issued by the terminal. Three non-limiting examples of embodiment will be described below. In the first case, all the receiving-only radio base stations 3 and the receivers of the transceiver radio base stations 7 operate in the same radio channel, as may happen with access systems based on CDMA (Code Division Multiple Access), such as CDMA2000 and W-CDMA. In this case, each signal issued by the terminal 10 on the radio channel whereto the receiving-only radio base stations 3 and the receivers of the transceiving radio base stations 7 are tuned can be received by all the receiving-only radio base stations 3 and all the receivers of the transceiver radio base stations 7 located within the transmission range of the terminal 10, similarly to what happens in the above-mentioned CDMA2000 and W-CDMA systems.

In the second case, the receiving-only radio base stations 3 and the receivers of the transceiver radio base stations 7 operate on a limited set of radio channels, which are known to the terminal 10 because they have been predetermined, or because their characteristics (frequency, bandwidth, modulation and the like) are stated in the signals broadcast by the broadcast channels of the network of the transmitting-only radio base stations 5, or because said characteristics have been communicated to the terminal 10 in suitable messages by the serving transmitting radio base station 6. In this case, the terminal 10 transmits the URRA messages in all said radio channels.

In the third case, the system includes a radio channel specially dedicated to the transmission of URRA messages, so that each terminal 10 transmits the URRA messages in that channel with the required technical specifications, while all the receiving-only radio base stations 3 and the transceiving radio base stations 7 have a receiver tuned to said channel and suitable for receiving URRA messages.

The features of the present invention, as well as the advantages thereof, are apparent from the above description.

One first advantage of the present invention is that, thanks to the method according to the present invention, it is possible to use extreme codings and/or modulations that are more effectively applicable to downlink transmission.

For example, MIMO codings can be brought to maximum efficiency levels in the downlink direction. Every effort under this aspect, i.e. towards the exploitation of advanced modulation and coding techniques, will therefore tend to alleviate the thirst for band in the downlink direction compared to the uplink direction: as a consequence, uplink coverages will mainly have to aim at re-using the frequencies by means of smaller cells. On the other hand, inter-cell interference due to frequency re-use is usually more critical in the downlink direction, and therefore it may realistically be conceived to employ smaller and more numerous uplink cells.

A second advantage of the present invention is that the method according to the invention makes it possible to optimize the number of radio base stations by using just a few radio base stations in downlink and sharing the radio base stations in uplink. In fact, in many countries the sharing of sites is limited by the necessity of complying with compelling electromagnetic emission limits, whereas no such limits apply to sharing non-transmitting uplink sites. Furthermore, it will be less problematic to entrust the uplink coverage to a single operator, possibly with no downlink coverage, and to operate from those base stations on all the frequencies of the operators that are present in the service area: in this manner it will be possible to significantly reduce the number of uplink sites. For example, a fixed network operator may stand as a candidate for offering this service to all mobile operators, at least in densely populated areas.

A further advantage offered by the present invention is that the separation between downlink and uplink allows to fully exploit the base stations' directivity functions in downlink.

Another advantage of the present invention is that it is not necessary to plan the frequencies to be used for downlink and for uplink, since the network managers and operators may be different and may share out the charge of supporting every single communication, thus using those frequencies that they consider to be most suitable.

Yet another advantage of the present invention is that the method according to the present invention introduces innovative networking scenarios with further optimization margins. In fact, the present invention enables to rationalize the infrastructural resources, thereby contributing to reducing the investments required for increasing the system's capacity. Appropriate agreements among the operators may lead to a significant optimization of the resources.

All these advantages and many others. deriving from the independence of the uplink and downlink coverages, can be easily implemented by using the signalling protocol according to the invention, in particular by introducing appropriate signalling messages.

The bi-directional communication method in a cellular mobile telecommunication network and the relative telecommunication network described herein by way of example may be subject to many possible variations without departing from the novelty spirit of the inventive idea; it is also clear that in the practical implementation of the invention the illustrated details may have different shapes or be replaced with other technically equivalent elements.

It can therefore be easily understood that the present invention is not limited to a bi-directional communication method in a cellular mobile telecommunication network and the relative telecommunication network as described above, but may be subject to many modifications, improvements or replacements of equivalent parts and elements without departing from the inventive idea, as clearly specified in the following claims.

The invention claimed is:

1. A method of bi-directional communication in a cellular mobile telecommunication network comprising
a terminal,
a downlink network, including at least one transmitting-only or transceiving base station, and
a plurality of receiving-only or transceiving uplink base stations belonging to one common uplink network or to a plurality of uplink networks,
wherein said downlink network is interconnected and interacts with said common uplink network or said plurality of uplink networks, and at least one base station of said plurality of receiving-only or transceiving uplink base stations is technologically heterogeneous with respect to said at least one base station of said downlink network,
the method comprising:
receiving, by said terminal, signals transmitted by at least one of said at least one transmitting-only or transceiving base station of said downlink network;
selecting, as a serving downlink base station serving the downlink section of said terminal, one base station of said downlink network that said terminal receives;
broadcasting, by said terminal, in at least one specially dedicated channel, a random access signalling message (URRA—Uplink Request via Random Access) which can be received by base stations of said plurality of uplink base stations, including uplink base stations that are technologically heterogeneous with respect to said serving downlink base station, wherein said random access signalling message (URRA) comprises at least one of the following pieces of information: an identifier TOFRs id of said serving downlink base station, the power transmitted by said terminal, parameters of signal quality reception from said serving downlink base station and also from other downlink base stations, an estimated geographical position of said terminal; and
selecting, by said cellular mobile telecommunication network, as a serving uplink base station serving the uplink section of said terminal, one of the base stations of said plurality of uplink base stations that have received said random access signalling message (URRA) broadcast by said terminal, wherein each receiving-only or transceiving uplink base station of said plurality of uplink base stations that have received said random access signaling message (URRA) forwards to said cellular mobile telecommunication network, either directly or indirectly, a message confirming the reception of said random access signalling message (URRA), said confirmation message comprising at least an identifier (ROFR_id) of the forwarding base station, an identifier (ID; T_ID) of the terminal that originated said signalling message (URRA), and at least one of the following pieces of information: an identifier TOFRs_id of said serving downlink base station, the power level at which said random access signalling message (URRA) has been received, and the indication of the transmission resources that are available for possibly establishing a connection with said terminal.

2. The method according to claim 1, wherein said cellular mobile telecommunication network selects said serving uplink base station based on the information contained in said confirmation messages and on at least one selection criteria of its own.

3. The method according to claim 2, wherein, if the network is a multi-operator network, said selection is made by one of said operators that operates said serving downlink base station.

4. The method according to claim 2, wherein said selection criteria comprise a choice of assigning the uplink communication to the base station of said plurality of uplink base stations which has received the most powerful random access signalling message (URRA).

5. The method according to claim 2, wherein said selection criteria comprise a choice of assigning the uplink communication to a receiving-only or transceiving base station, of said plurality of uplink base stations, belonging to a preferred operator.

6. The method according to claim 2, wherein said selection criteria comprise a choice of assigning the uplink communication based on the operator that manages it and on the quality with which that operator could serve the communication.

7. The method according to claim 2, wherein said selection criteria comprise a choice of assigning the uplink communication to base stations of said plurality of uplink base stations by preferring those which are statistically less frequently saturated with traffic.

8. The method according to claim 2, wherein said selection criteria comprise a choice of assigning the uplink communication based on technologies supported by said terminal.

9. The method according to claim 2, wherein said selection criteria comprise a choice of assigning the uplink communication according to services that have to be supported with said communication.

10. The method according to claim 1, wherein the channel assigned to downlink communication and the channel assigned to uplink communication have the same bandwidth and are frequency-spaced in a predefined way.

11. The method according to claim 1, wherein the channel assigned to downlink communication and the channel assigned to uplink communication have the same bandwidth and are frequency-spaced in a variable way.

12. The method according to claim 1, wherein the channel assigned to downlink communication and the channel assigned to uplink communication have different bandwidths and are frequency-spaced in a variable way.

13. The method according to claim 1, wherein said receiving-only or transceiving uplink base stations operate in the same radio channel.

14. The method according to claim 1, wherein said receiving-only or transceiving uplink base stations operate in a limited set of radio channels.

15. A cellular mobile telecommunication network, comprising:
a downlink network comprising at least one transmitting-only or transceiving base station;
a plurality of receiving-only or transceiving uplink base stations belonging to one common uplink network or a number of distinct uplink networks;
a terminal configured to:
receive signals transmitted by at least one base station of said downlink network of said cellular mobile telecommunication network;
select, as a serving downlink base station serving the downlink section of said terminal, one base station of said downlink network;
broadcast, in at least one specially dedicated channel, a random access signalling message (URRA—Uplink Request via Random Access) which can be received by base stations of said plurality of uplink base stations, including base stations that are technologically heterogeneous with respect to said serving downlink base station, wherein said random access signalling message (URRA) comprises at least one of the following pieces of information: an identifier TOFRs id of said serving downlink base station, the power transmitted by said terminal, parameters of signal quality reception from said serving downlink base station and also from other downlink base stations, an estimated geographical position of said terminal
wherein
said downlink network and said common or distinct uplink networks are interconnected and interact, and
said cellular mobile telecommunication network selects, as a serving uplink base station serving the uplink section of said terminal, one of the base stations, of said plurality of uplink base stations, that have received said random access signalling message (URRA) broadcast by said terminal, wherein each receiving-only or transceiving uplink base station of said plurality of uplink base stations that have received said random access signaling message (URRA) forwards to said cellular mobile telecommunication network, either directly or indirectly, a message confirming the reception of said random access signalling message (URRA), said confirmation message comprising at least an identifier (ROFR_id) of the forwarding base station, an identifier (ID;T_ID) of the terminal that originated said signalling message (URRA), and at least one of the following pieces of information: an identifier TOFRs_id of said serving downlink base station, the power level at which said random access signalling message (URRA) has been received, and the indication of the transmission resources that are available for possibly establishing a connection with said terminal.

16. A terminal for a cellular mobile telecommunication network, comprising receivers for receiving signals transmitted by base stations of a downlink network of said cellular mobile telecommunication network and logic circuits for selecting one base station as serving downlink base station among said base stations of said downlink network, said terminal being characterized in that it further comprises:
transmitters for broadcasting, in at least one specially dedicated channel, a random access signalling message (URRA) which can be received by a plurality of receiving-only or transceiving uplink base stations belonging to one common uplink network or a number of distinct uplink networks of said cellular mobile telecommunication network, including base stations of said plurality of uplink base stations that are technologically heterogeneous with respect to said serving downlink base station, wherein said random access signalling message (URRA) comprises at least one of the following pieces of information: an identifier TOFRs id of said serving downlink base station, the power transmitted by said terminal, parameters of signal quality reception from said serving downlink base station and also from other downlink base stations, an estimated geographical position of said terminal; and
transmitters for transmitting signals to at least one of said plurality of uplink base stations which have received said random access signalling message (URRA) broadcast by said terminal, said at least one uplink base station being identified by data contained in information signals transmitted by said serving downlink base station to said terminal, wherein each receiving-only or transceiving uplink base station of said plurality of uplink base stations that have received said random access signaling message (URRA) forwards to said cellular mobile telecommunication network, either directly or indirectly, a message confirming the reception of said random access signalling message (URRA), said confirmation message comprising at least an identifier (ROFR_id) of the forwarding base station, an identifier (ID;T_ID) of the terminal that originated said signalling message (URRA), and at least one of the following pieces of information: an identifier TOFRs_id of said serving downlink base station, the power level at which said random access signalling message (URRA) has been received, and the indication of the transmission resources that are available for possibly establishing a connection with said terminal.

* * * * *